United States Patent
Dobrenizki et al.

(10) Patent No.: US 10,985,385 B2
(45) Date of Patent: Apr. 20, 2021

(54) LAYER AND LAYER SYSTEM, AS WELL AS BIPOLAR PLATE, FUEL CELL AND ELECTROLYSER

(71) Applicant: Schaeffler Technologies AG & Co. KG, Herzogenaurach (DE)

(72) Inventors: Ladislaus Dobrenizki, Höchstadt (DE); Tim Hosenfeldt, Nuremberg (DE); Yashar Musayev, Nuremberg (DE); Detlev Repenning, Reinbeck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 95 days.

(21) Appl. No.: 16/070,997

(22) PCT Filed: Jan. 5, 2017

(86) PCT No.: PCT/DE2017/100007
§ 371 (c)(1),
(2) Date: Jul. 18, 2018

(87) PCT Pub. No.: WO2017/140293
PCT Pub. Date: Aug. 24, 2017

(65) Prior Publication Data
US 2019/0051913 A1    Feb. 14, 2019

(30) Foreign Application Priority Data
Feb. 17, 2016   (DE) .................. 10 2016 202 372.1

(51) Int. Cl.
| | | |
|---|---|---|
| *H01M 8/0228* | (2016.01) | |
| *C23C 28/04* | (2006.01) | |
| *C23C 28/00* | (2006.01) | |
| *H01M 8/021* | (2016.01) | |
| *C25B 9/04* | (2006.01) | |
| *H01M 8/0208* | (2016.01) | |
| *H01M 8/0215* | (2016.01) | |
| *C25B 9/20* | (2006.01) | |
| *C25B 9/18* | (2006.01) | |

(52) U.S. Cl.
CPC ......... *H01M 8/0228* (2013.01); *C23C 28/042* (2013.01); *C23C 28/321* (2013.01); *C23C 28/34* (2013.01); *C23C 28/341* (2013.01); *C25B 9/04* (2013.01); *C25B 9/18* (2013.01); *C25B 9/20* (2013.01); *H01M 8/021* (2013.01); *H01M 8/0208* (2013.01); *H01M 8/0215* (2013.01)

(58) Field of Classification Search
None
See application file for complete search history.

(56) References Cited

U.S. PATENT DOCUMENTS

| | | | |
|---|---|---|---|
| 2004/0005502 A1 | 1/2004 | Schlag | |
| 2008/0057371 A1 | 3/2008 | Washima et al. | |
| 2011/0033784 A1* | 2/2011 | Ljungcrantz | C23C 28/023 429/524 |

FOREIGN PATENT DOCUMENTS

| | | |
|---|---|---|
| CN | 101069315 A | 11/2007 |
| CN | 101743657 A | 6/2010 |
| CN | 101950807 A | 1/2011 |
| CN | 102017254 A | 4/2011 |
| CN | 102148243 A | 8/2011 |
| DE | 19937255 B4 | 2/2001 |
| DE | 10017200 A1 | 10/2001 |
| DE | 10058337 A1 | 5/2002 |
| DE | 10230395 A1 | 1/2004 |
| DE | 102006029473 A1 | 1/2007 |
| DE | 112005001704 T5 | 8/2009 |
| DE | 102009010279 A1 | 10/2009 |
| DE | 112008003275 T5 | 9/2010 |
| DE | 102010026330 A1 | 4/2011 |
| DE | 102013209918 A1 | 12/2013 |
| EP | 1273060 B1 | 1/2003 |
| JP | 2011517013 A | 5/2011 |
| WO | 2009108102 A1 | 9/2009 |
| WO | 2015134636 A1 | 9/2015 |
| WO | WO-2015134636 A1 * | 9/2015 ........... C23C 14/165 |

* cited by examiner

*Primary Examiner* — Daniel S Gatewood
(74) *Attorney, Agent, or Firm* — Reid Baldwin

(57) ABSTRACT

Layers for a bipolar plates are disclosed, as well as bipolar plates including the layers and fuel cells and/or electrolyzers including the bipolar plates. The layer may include a homogeneous or heterogeneous solid metallic solution or compound which either contains a first chemical element from the group of the noble metals in the form of iridium; or contains a first chemical element from the group of the noble metals in the form of iridium and a second chemical element from the group of the noble metals in the form of ruthenium. The layer may also include at least one further nonmetallic chemical element from the group consisting of nitrogen, carbon, boron, fluorine, and hydrogen.

15 Claims, 1 Drawing Sheet

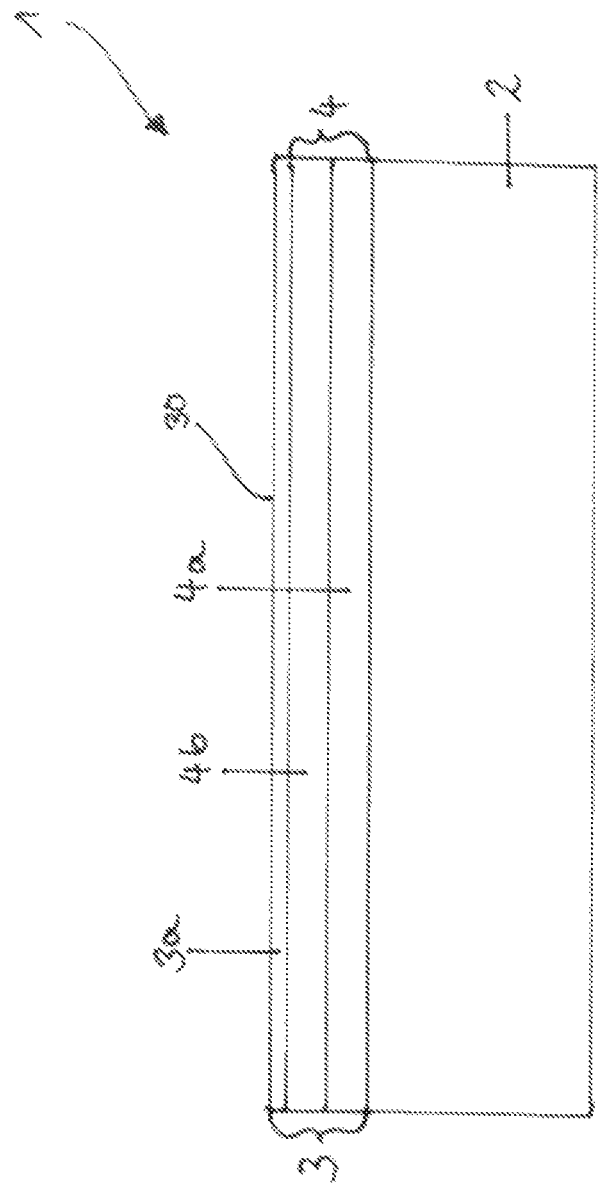

LAYER AND LAYER SYSTEM, AS WELL AS BIPOLAR PLATE, FUEL CELL AND ELECTROLYSER

CROSS-REFERENCE TO RELATED APPLICATIONS

This application is the U.S. National Phase of PCT Appln. No. PCT/DE2017/100007 filed Jan. 5, 2017, which claims priority to DE 10 2016 202 372.1 filed Feb. 17, 2016, the entire disclosures of which are incorporated by reference herein.

TECHNICAL FIELD

The disclosure relates to a layer, in particular for a bipolar plate of a fuel cell or of an electrolyzer. The disclosure further relates to a layer system having such a layer and also a bipolar plate having such a layer system. The disclosure also relates to a fuel cell or an electrolyzer having such a bipolar plate.

BACKGROUND

Electrochemical systems such as fuel cells, in particular polymer electrolyte fuel cells, and conductive, current-collecting plates for such fuel cells and electrolyzers and also current collectors in electrochemical cells and electrolyzers are known.

An example is the bipolar or monopolar plates in fuel cells, in particular in an oxygen half-cell. The bipolar or monopolar plates are in the form of carbon plates (e.g. graphoil plates) which contain carbon as main constituent. These plates tend to be brittle and are comparatively thick, so that they significantly reduce a performance volume of the fuel cell. A further disadvantage is their lack of physical (e.g. thermomechanical) and/or chemical and/or electrical stability.

The production of the current-collecting plates of the fuel cell from metallic (in particular austenitic) stainless steels is likewise known. The advantage of these plates is an achievable thickness of the plates of less than 0.5 mm. This thickness is desirable so that both a construction volume and also a weight of the fuel cell can be kept as small as possible. A problem associated with these plates is that surface oxides are formed during operation of the fuel cell, so that a surface resistance is increased too much and/or electrochemical destruction (for example corrosion) occurs.

In order to achieve the requirements for, for example, the use of bipolar plates of fuel cells, the first publications DE 10 2010 026 330 A1, DE 10 2013 209 918 A1, DE 11 2005 001 704 T5 and DE 11 2008 003 275 T5 disclose coating austenitic stainless steels as supports with a gold layer in a band region of up to 2 nm. Nevertheless, this solution to the problem has a number of disadvantages. Thus, for example, a gold layer which is only 2 nm thick is still too expensive for mass-market applications. A substantially greater disadvantage lies in a basic property of the chemical element gold. Gold is more noble than the support material made of non-rusting austenitic steel (stainless steel) and as a result brings about dissolution of the support (e.g. pitting corrosion) in the fuel cells under unfavorable operating conditions, and this leads to a reduction in the life. Particularly in the case of a chloride-containing environment (e.g. aerosols), corrosion cannot be prevented.

A further disadvantage is, in particular, that gold is not stable in either an acidic or basic environment for high-load applications, e.g. under electrolysis conditions above 1500 mV standard hydrogen units.

Layers on the support in the form of hard material layers based on nitride or carbide are likewise known from the prior art. An example here is titanium nitride, but this tends to form oxidic metal complexes through to closed surface layers during operation of a fuel cell. This results in an increase in the surface resistance to high values, as in the case of stainless steel. Processes for coating with chromium nitride or chromium carbonitride are disclosed, for example, in the patent documents DE 199 37 255 B4 and EP 1273060 B1 and the first publication DE 100 17 200 A1.

The hard material layers have, depending on the composition, very good operating properties (for example resistance to corrosion, abrasion resistance, high contour trueness), but suffer from the risk of anodic dissolution because concentration chains are formed in the fuel cell under unfavorable operating conditions. This anodic dissolution occurs when in the case of internal electrochemical short circuits in the fuel cell, e.g. in the case of formation of a water film between an active electrode of a membrane-electrode assembly of the fuel cell and the bipolar plate, a local element or an unexpected and undesirable reaction element is formed.

Multiple coatings based on nitrides with very thin gold or platinum layers are likewise known. In this way, satisfactory operating results for a fuel cell can be achieved at layer thicknesses of the noble metals of more than 2 µm. The fundamental problem of dissolution remains at high anodic potentials. The layer thickness ensures virtually pore-free coverage and thus reduces the risk of pitting corrosion.

Furthermore, dimensionally stable anodes are known. Here, single-phase or multiphase oxides comprising ruthenium oxide and/or iridium oxide are formed with the aid of refractory metals. Although this type of layer is very stable, it brings about excessively high electrical resistances. A similar situation also applies when a surface of the support, which is generally made of a noble metal, is doped with iridium.

Thus, the metallic supports or a bipolar plate for a PEM fuel cell or an electrolyzer present in these electrochemical systems mentioned by way of example, in particular for energy conversion, have to meet the following requirements:
- high corrosion resistance in respect of a surrounding medium, and/or
- high resistance to anodically or cathodically polarizing loads,
- low surface resistance of a surface of the support, or a coating thereon, facing an electrolyte, and
- low production costs for the support, in particular an electrically conductive conductor in the form of bipolar plates for use of fuel cells in mobile applications, for example.

SUMMARY

It is accordingly an object of the present disclosure to provide an improved layer or an improved layer system quite generally for an energy converter, in particular for a bipolar plate of a fuel cell or an electrolyzer. It is a further object of the disclosure to indicate a bipolar plate having an improved layer system and a fuel cell equipped therewith and an electrolyzer equipped therewith.

The object is achieved according to the disclosure by a layer, in particular for a bipolar plate of a fuel cell or of an electrolyzer, wherein the layer includes a homogeneous or heterogeneous solid metallic solution or compound which either contains a first chemical element from the group of the noble metals in the form of iridium or contains a first chemical element from the group of the noble metals in the form of iridium and a second chemical element from the group of the noble metals in the form of ruthenium and also contains at least one further nonmetallic chemical element from the group consisting of nitrogen, carbon, boron, fluorine, hydrogen.

The object is also achieved according to the disclosure by a layer system, in particular for a bipolar plate of a fuel cell or of an electrolyzer, comprising a covering layer and a base layer system in which the covering layer is in the form of the layer according to the disclosure.

The object is additionally achieved according to the disclosure by a bipolar plate comprising a substrate and the layer system according to the disclosure applied at least in partial areas of a surface of the substrate.

The object is additionally achieved according to the disclosure by a fuel cell, in particular a polymer electrolyte fuel cell, comprising at least one bipolar plate according to the disclosure.

The object is additionally achieved according to the disclosure by an electrolyzer comprising at least one bipolar plate according to the disclosure.

Advantageous embodiments with useful and nontrivial variants of the disclosure are also described herein.

The layer according to the disclosure may be electrically conductive and electrocatalytically active and also affords corrosion protection.

For the purposes of the present disclosure, a homogeneous metallic solution (type 1) is a metallic solution in which said nonmetallic chemical elements are dissolved in the metal lattice in such a way that the lattice type of the host metal or the host metal alloy remains essentially unchanged.

For the purposes of the present disclosure, a homogeneous metallic compound (type 2) is a metallic compound in which, at an elevated concentration of the dissolved nonmetallic chemical elements, a new lattice type is formed, e.g. in the case of formation of the stoichiometric compound iridium carbide. Homogeneous phases are also spoken of here.

For the purposes of the present disclosure, a heterogeneous metallic solution or compound is a solution or compound in which either the different phases (type 1 and type 2) are present side by side or one of the nonmetallic chemical elements is present in elemental form in addition to the metal-containing phases in a mixed phase. For example, depending on the particular phase diagram of the binary or multinary system, elemental carbon can be present in addition to the alpha-phase (type 1), i.e., for example, alpha-ruthenium, or, for example, carbon can be present in addition to iridium carbide.

Depending on the deposition conditions, the layer according to the disclosure can be metastable or stable in the thermodynamic sense.

The layer of the disclosure is, in particular, additionally characterized in that the noble metals in the form of iridium or in the form of ruthenium and iridium form solid stoichiometric compounds with the nonmetallic chemical elements.

It has been found that the conductivity of the layer is higher in the case of a carbon-containing layer, i.e. when the metalloid or nonmetallic chemical element carbon is introduced, than in the case of gold and at the same time the oxidation stability of the layer in an acidic solution is significantly above a voltage of 2000 mV of a standard hydrogen electrode. Measured specific electrical resistances are, depending on the embodiment, less than 5 mΩ cm-2 (under standardized conditions).

In comparison, the specific electrical resistance of gold is about 10 mΩ cm-2 at room temperature.

A further important advantage is that iridium does not oxidize and go into solution at voltages above the value E=2.04-0.059 lg pH—-0.0295 lg (IrO4)2-. In the solid solution, the low-valence iridium is thus stabilized to such an extent that the otherwise usual oxidation at about 1800 mV in 1 mol/l (1N) sulfuric acid (H2SO4) no longer takes place. The gaining of free partial mixing energy ΔGmix of the solid solutions or compounds is critical to the stabilization.

The layer of the disclosure preferably has a layer thickness of from at least 1 nm to not more than 10 nm.

For example, at a layer thickness of about 10 nm when using (Ir,Nb)C1-x, only 4 µg of Ir is present per cm2 of the layer. In the case of a 10 nm thick gold layer, more than 20 µg of gold per cm2 have to be used. The advantage of the layer of the disclosure compared to a gold layer is the high oxidation stability up to voltages far above 2000 mV relative to a standard hydrogen electrode in 1N sulfuric acid.

In the case of a layer according to the disclosure which comprises carbidic compounds, the stability of, for example, iridium-containing dimensionally stable anode electrodes is increased significantly.

The layer of the disclosure preferably additionally comprises at least one metal from transition group IV. and/or V. of the Periodic Table of the chemical elements. The advantage of using these metals, either in elemental form or in the form of compounds, is that they form self-protecting, stable and conductive oxides under corrosion conditions.

The at least one nonmetallic chemical element is preferably present in a concentration in the range from 0.1 at.-% to 65 at.-%, in particular from 10 to 30 at. %, in the layer. In particular, the nonmetallic chemical element carbon is present in the concentration range from 10 to 25 at.-% in the layer.

In particular, a layer according to the disclosure which a) comprises more than 35 at.-% of iridium and additionally carbon; or b) comprises more than 35 at.-% of iridium and additionally carbon and hydrogen; or c) comprises more than 35 at.-% of iridium and additionally carbon and fluorine, optionally additionally hydrogen; or d) comprises a total of more than 35 at.-% of iridium and ruthenium and additionally carbon; or e) comprises a total of more than 35 at.-% of iridium and ruthenium and additionally carbon and hydrogen; or f) comprises a total of more than 35 at.-% of iridium and ruthenium and additionally carbon and fluorine, optionally additionally hydrogen, has been found to be useful.

The hydrogen present or optionally present in the layer compositions b), c), e) and f) is present only in traces.

Furthermore, the layer of the disclosure can contain at least one chemical element from the group of the base metals. The at least one chemical element from the group of the base metals is preferably formed by aluminum, iron, nickel, cobalt, zinc, cerium or tin and/or present in the concentration range from 0.01 to 65 at.-%, in particular from 0.01 to 5 at.-%, in the layer.

In a further advantageous embodiment of the layer of the disclosure, the layer comprises at least one chemical element from the group of the refractory metals, in particular titanium and/or zirconium and/or hafnium and/or niobium and/or tantalum. It has been found that amounts of H2O2 and ozone formed during the electrolysis are additionally partly controlled by the addition of the refractory metals.

The layer of the disclosure, preferably comprising solid stoichiometric compounds, is preferably formed as multinary compound when refractory metals are added.

The layer of the disclosure comprising at least one refractory metal has, particularly in a temperature range from 0 to about 200° C., a high conductivity and a high corrosion resistance. Thus, excellent properties for durable use in, for example, fuel cells are obtained using multinary solid iridium- and/or ruthenium-containing layers.

A further advantage arises from coating of electrical conductors, in particular metallic bipolar plates, regardless of whether the electrical conductor such as a bipolar plate is designed for low-temperature polymer electrolyte fuel cells or for high-temperature polymer electrolyte fuel cells. The particular advantage is that the layer of the disclosure having a density of 10-13 gcm-3 has virtually only half the density of a pure noble metal. This makes it possible to reduce the use of expensive noble metals and/or compounds thereof, in particular by formation of multinary compounds with the other elements.

The at least one chemical element from the group of the refractory metals is preferably present in the concentration range from 0.01 to 65 at.-%, in particular from 0.01 to 5 at.-%, in the layer.

If the at least one chemical element from the group of the base metals is present in the form of tin, this and the at least one chemical element from the group of the refractory metals are together present in the concentration range from 0.01 to 65 at.-%, in particular from 0.01 to 5 at.-%, in the layer.

It has been found to be useful for the layer of the disclosure to additionally comprise at least one additional chemical element from the group of the noble metals in a concentration range from 0.01 to 10 at.-%. The chemical element from the group of the noble metals is in particular platinum, gold, silver, rhodium, palladium.

It has been found to be useful for all chemical elements from the group of the noble metals, i.e. together with iridium and ruthenium, to be present in the concentration range from 35 to 99 at.-% in the layer.

The corrosion protection on metallic supports, e.g. supports made of steels, in particular stainless steels, or titanium, is improved further by the layer according to the disclosure being applied on a substrate system formed between the support and the layer. This is particularly advantageous when corrosive environments are present, in particular when the corrosive media contain chloride.

Underlying oxidation, i.e. oxidation of the surface of a support having a layer applied to this surface, normally leads to delamination of noble metal layers located thereon.

The layer system of the disclosure, in particular for a bipolar plate of a fuel cell or of an electrolyzer, therefore comprises a covering layer and a base layer system, with the covering layer being in the form of the layer according to the disclosure.

In particular, the base layer system comprises at least one base layer which comprises at least one chemical element from the group consisting of titanium, niobium, hafnium, zirconium, tantalum.

The base layer system has, in particular, a first base layer in the form of a metallic alloy layer comprising the chemical elements titanium and niobium, in particular 20-50% by weight of niobium and titanium as balance.

The base layer system has, in particular, a second base layer comprising at least one chemical element from the group consisting of titanium, niobium, zirconium, hafnium, tantalum and additionally at least one nonmetallic element from the group consisting of nitrogen, carbon, boron, fluorine.

The base layer system has, in one embodiment, a second base layer comprising the chemical elements a) titanium, niobium and additionally carbon and fluorine, or b) titanium, niobium and additionally nitrogen, and is in particular formed by (Ti67Nb33)N0.8-1.1.

The second base layer is preferably arranged between the first base layer and the covering layer.

The second base layer can additionally contain up to 5 at.-% of oxygen.

The further advantage of the choice of a multinary compound for the layer according to the disclosure or the covering layer is that although it forms oxides under high anodic voltages of up to 3500 mV relative to a standard hydrogen electrode or in the presence of hydrogen peroxide or ozone, these oxides are electrically conductive and self-healing. They tend to form inert and conductive mixed oxide layers with the second base layer.

The bipolar plate according to the disclosure comprises a metallic substrate and a layer system according to the disclosure applied at least in partial areas of the surface of the substrate. In particular, the layer system is applied over the full area of one or both sides of the substrate in plate form. The metallic substrate is, in particular, made of steel or titanium, preferably of stainless steel. A thickness of the substrate is preferably less than 1 mm and is in particular equal to 0.5 mm.

A fuel cell according to the disclosure, in particular a polymer electrolyte fuel cell, comprising at least one bipolar plate according to the disclosure has been found to be particularly advantageous in respect of the electrical values and the corrosion resistance. Such a fuel cell therefore has a long life of more than 10 years or more than 5000 operating hours of a motor vehicle.

Comparably long lives are achievable in the case of an electrolyzer according to the disclosure, which operates according to the reverse of the working principle of a fuel cell and with the aid of electric current brings about a chemical reaction, i.e. a conversion of material. In particular, the electrolyzer is an electrolyzer suitable for hydrogen electrolysis.

Advantageously, a thickness of the layer according to the disclosure of less than 10 nm is sufficient to protect against resistance-increasing oxidation of the second base layer. To give reliable corrosion protection, sublayers of the base layer system are made of at least one refractory metal which is applied in at least two layers to the steel, in particular stainless steel, firstly as metal or alloy layer (=first base layer) and then as metalloid layer (=second base layer). The double layer formed by the two sublayers underneath the layer according to the disclosure firstly ensures electrochemical matching to a support material, i.e. the material of which the support is made, and, secondly, pore formation due to oxidation and hydrolysis processes is prevented.

The electrochemical matching to the support material may be necessary since both the metalloid layer (=second base layer) and the layer according to the disclosure or the covering layer are very noble. Pore formation would build up high local element potentials, leading to unacceptable corrosion currents. The metallic first base layer is preferably formed by titanium or niobium or zirconium or tantalum or hafnium or of alloys of these metals, which are less noble than the support material in the form of steel, in particular stainless steel, and react in the case of corrosion phenomena firstly to form insoluble oxides or voluminous sometimes gel-like hydroxo compounds of these refractory metals. As a result, the pores grow shut and protect the base material against corrosion. The process represents self-healing of the layer system.

A second base layer in the form of a nitridic layer serves, in particular, as hydrogen barrier and thus protects the substrate, in particular a substrate composed of stainless steel, of the bipolar plate and also the metallic first base layer against hydrogen embrittlement.

BRIEF DESCRIPTION OF THE DRAWINGS

Further advantages, features and details of the disclosure can be derived from the following description of preferred working examples and the FIGURE. The features and combinations of features mentioned above in the description can be employed not only in the combination indicated in each case but also in other combinations or on their own, without going outside the scope of the disclosure.

The FIGURE shows an example cross-section of a bipolar plate having a layer system applied thereon.

DETAILED DESCRIPTION

The FIGURE shows a bipolar plate 1 comprising a substrate 2 composed of stainless steel and a layer system 3 applied over the full area of one side of the substrate 2. The layer system 2 comprises a covering layer 3a and a base layer system 4 comprising a first base layer 4a and a second base layer 4b.

In a first working example, a metallic substrate 2 has been produced in the form of a conductor, here for a bipolar plate 1 of a polymer electrolyte fuel cell for the conversion of (reformed) hydrogen, composed of a stainless steel, in particular of an austenitic steel meeting very demanding known requirements in respect of corrosion resistance, e.g. with the DIN ISO material number 1.4404.

A layer system 3 according to the disclosure is formed on the substrate 2 of the bipolar plate 1 by a coating process, for example a vacuum-based coating process (PVD), with the substrate 2, in a pass through the process, being coated firstly with a first base layer 4a in the form of a 1.5 μm thick titanium layer, subsequently with an approximately equally thick second base layer 4b in the form of a titanium nitride layer and subsequently with a covering layer 3a in the form of a 25 nm thick titanium-iridium nitride layer. The covering layer 3a corresponds to a sublayer which is open on one side since only a covering layer surface of a further layer, here the second base layer 4b, is in contact with the covering layer. The free surface 30 of the covering layer 3a in a fuel cell is thus arranged directly adjacent to an electrolyte, in particular a polymer electrolyte, and is exposed thereto.

In a second working example, the metallic substrate 2 for the bipolar plate 1 is firstly coated with a first base layer 4a in the form of a metallic alloy layer having a thickness of a number of 100 nm, with the metallic alloy layer having the composition $Ti0.9\ Nb0.1$. A further application of a second base layer 4b having a thickness of again a number of 100 nm and the composition $Ti0.9\ Nb0.1\ N1\text{-}x$ is subsequently carried out. A covering layer 3a is applied thereon in a thickness of a number of nm with the composition $(Ti,Nb\text{—}Ir)N1\text{-}\delta$.

The advantage is an extraordinarily high stability to oxidation of the bipolar plate 1 according to the disclosure. Even at long-term subjection to +3000 mV relative to a standard hydrogen electrode, no increase in resistance is found in sulfuric acid solution having a pH of 3. It appears to be particularly advantageous when a covering layer 3a having the composition $(Ti0.9\ Nb0.1\ Iry)N1\text{-}\varphi\ O\varphi$, which has a comparatively high residual conductivity and reacts with iridium (Ir) under a high anodic load to form a stable quaternary mixed oxide, is formed during operation of a fuel cell. The free surface 30 of the covering layer 3a remains on the exterior, so that the surface of the covering layer 3a facing away from the substrate 2 has a shiny silvery appearance even after subjection to +2000 mV relative to a standard hydrogen electrode over a period of 50 hours. Even under a scanning electron microscope, it is not possible to discern any traces of corrosion extending through the thickness of the covering layer 3a to the substrate 2 or reaching the substrate 2.

The covering layer 3a according to the disclosure of the second working example can be applied both by the sputtering technique and also by a cathodic arc coating process, also referred to as vacuum electric arc evaporation. Despite a higher droplet count, in other words a metal droplet count which is higher than in the case of sputtering technology, the covering layer 3a according to the disclosure produced in the cathodic arc process also has the advantageous properties of high corrosion resistance combined with temporally stable surface conductivity of the covering layer 3a according to the disclosure produced by the sputtering technique.

In a third embodiment, the layer system 3 according to the disclosure is formed on a substrate 2 in the form of a structured perforated stainless steel sheet. The substrate 2 has been electrolytically polished in an H2SO4/H3PO4 bath before application of a layer system 3. After application of a single base layer in the form of a tantalum carbide layer having a thickness of a number of 1000 nm, a covering layer 3a in the form of an iridium carbide layer having a thickness of a number of 100 nm is applied.

The advantage of the base layer formed by the tantalum carbide is not only its extraordinary corrosion resistance but also the fact that it does not absorb hydrogen and thus serves as hydrogen barrier in respect of the substrate 2. This is particularly advantageous if titanium is used as substrate material.

The layer system 3 according to the disclosure of the third working example is suitable for use of an electrolysis cell for producing hydrogen at current densities i which are greater than 500 mA cm-2.

The advantage of the metalloid layer which has an intermediate position in the layer system and/or is closed on both sides or of the second base layer, which in the simplest case is formed, for example, by titanium nitride, is its low electrical resistance of 10-12 mΩ cm-2. Likewise, the layer or covering layer according to the disclosure can also be configured without a second base layer or metalloid layer, with a possible increase in resistance.

Some layer systems together with their characteristic values are shown by way of example in table 1.

TABLE 1

Layers and selected characteristic values

| | Layer system/layer thickness | Surface resistance | Corrosion current at 2000 mV standard hydrogen column in $\mu A\ cm^{-2}$ in aqueous sulfuric acid solution (pH 3) at T = 800° C. | Oxidation stability at 2000 mV measured as change in the surface resistance in $m\Omega\ cm^{-2}$ |
|---|---|---|---|---|
| 1 | Gold/3 µm (as reference) | 9 | >100 pitting current | 9-10 |
| 2 | Ti/0.5 µm TiN/1 µm $(Nb_{0.1}Ir_{0.9})C_{1-\delta}$/10 nm | 8 | 0.001 | 12 |
| 3 | TiNb/0.5 µm TiN/1 µm $(Nb_{0.1}Ir_{0.9})N_{1.05}$/10 nm | 10-11 | 0.001 | 10-11 |
| 4 | TiNb/0.1 µm IrC/10 nm | 7-8 | 0.01 | 4-6 |
| 5 | Ta/0.05 µm TaC/0.5 µm (Ta,Ir)C/5 nm | 10 | 0.001 | 17-18 |
| 6 | $ZrB_2$/0.3 µm $(Zr_{0.3}Ir_{0.7})B_{2-\delta}$/10 nm | 7 | Pitting reaction after exposure for 4 hours | |

Table 1 shows only some illustrative layer systems. The layer systems according to the disclosure advantageously do not display any increase in resistance at an anodic potential of +2000 mV relative to a standard hydrogen column in sulfuric acid solution at a temperature of 80° C. over a number of weeks. Some of the layer systems applied in high vacuum by a sputtering or ARC process or in a fine vacuum by the PECVD process (plasma enhanced chemical vapor deposition process) had a dark discoloration after this period of exposure. However, there were no visible corrosion phenomena or significant changes in the surface resistances.

LIST OF REFERENCE NUMERALS

1 bipolar plate
2 substrate
3 layer system
3*a* covering layer
4 base layer system
4*a* first base layer
4*b* second base layer
30 free surface

The invention claimed is:

1. A layer for a component of an electrochemical cell, wherein the layer comprises:
   a homogeneous or heterogeneous solid metallic solution which contains
   a first chemical element from the group of the noble metals in the form of iridium and a second chemical element from the group of the noble metals in the form of ruthenium;
   at least one further nonmetallic chemical element from the group consisting of nitrogen, carbon, boron, fluorine, and hydrogen embedded into a crystal lattice of the first chemical element.

2. The layer as claimed in claim 1, wherein the at least one nonmetallic chemical element is present in a concentration in the range from 0.1 at. % to 65 at.-% in the layer.

3. The layer as claimed in claim 1, wherein it
   a) comprises more than 35 at.-% of iridium and additionally carbon; or
   b) comprises more than 35 at.-% of iridium and additionally carbon and hydrogen; or
   c) comprises more than 35 at.-% of iridium and additionally carbon and fluorine, optionally additionally hydrogen
   d) comprises a total of more than 35 at.-% of iridium and ruthenium and additionally carbon; or
   e) comprises a total of more than 35 at.-% of iridium and ruthenium and additionally carbon and hydrogen; or
   f) comprises a total of more than 35 at.-% of iridium and ruthenium and additionally carbon and fluorine, optionally additionally hydrogen.

4. The layer as claimed in claim 1, including iridium and/or ruthenium, are present in a concentration range from 35 to 99 at.-% in the layer.

5. The layer as claimed in claim 1, wherein the at least one nonmetallic chemical element includes carbon and is present in a concentration range from 10 to 25 at.-% in the layer.

6. The layer as claimed in claim 1, wherein the layer has a layer thickness of from at least 1 nm to not more than 50 nm.

7. A layer system for an electrochemical cell, comprising:
   a base layer system; and
   a covering layer in the form of a solid metallic solution which contains
   a first chemical element from the group of the noble metals in the form of iridium;
   a second chemical element from the group of the noble metals in the form of ruthenium; and
   at least one further nonmetallic chemical element from the group consisting of nitrogen, carbon, boron, fluorine, and hydrogen embedded into a crystal lattice of the first chemical element.

8. The layer system as claimed in claim 7, wherein the base layer system has at least one base layer comprising at least one chemical element from the group consisting of titanium, niobium, hafnium, zirconium, and tantalum.

9. The layer system as claimed in claim 8, wherein the base layer system has at least one first base layer in the form of a metallic alloy layer comprising the chemical elements titanium and niobium.

10. The layer system as claimed in claim 8, wherein the base layer system has a second base layer comprising at least one chemical element from the group consisting of titanium, niobium, hafnium, zirconium, and tantalum and additionally at least one nonmetallic element from the group consisting of nitrogen, carbon, boron, and fluorine.

11. The layer system as claimed in claim 10, wherein the second base layer is arranged between the first base layer and the covering layer.

12. The layer system as claimed in claim 10, wherein the second base layer contains up to 5 at.-% of oxygen.

13. A bipolar plate comprising a metallic substrate and a layer system as claimed in claim 7 applied at least in partial areas of the surface of the metallic substrate.

14. An electrochemical cell comprising at least one bipolar plate as claimed in claim 13.

15. The layer of claim 1, wherein the solid metallic solution further contains at least one metal from transition groups IV or V of the periodic table.

* * * * *